Figure 1:
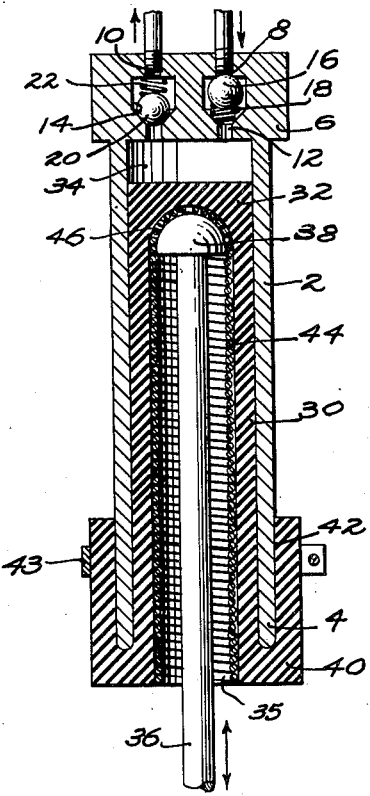

May 14, 1957     H. A. BERLINER     2,791,969

RECIPROCATING PUMP

Filed Sept. 28, 1953

Henry A. Berliner
INVENTOR

BY Scrivener + Parker
ATTORNEYS

2,791,969

RECIPROCATING PUMP

Henry A. Berliner, Washington, D. C.

Application September 28, 1953, Serial No. 382,676

5 Claims. (Cl. 103—148)

This invention relates to pumps and, more particularly, is intended to provide a reciprocating pump of very simple construction which, however, will be strong and rugged and may be easily assembled and disassembled and will have a minimum number of parts.

Figure 2:
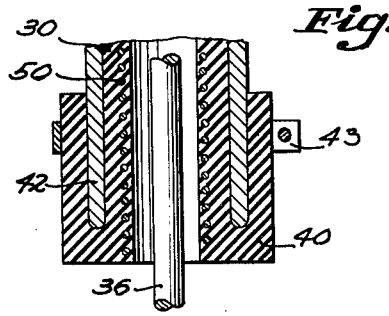
Figure 3:
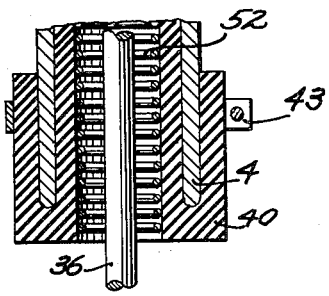

In the drawings forming part of this application,

Fig. 1 is a cross-sectional view taken longitudinally through a pump according to this invention, and Figs. 2 and 3 are fragmentary views showing modifications of certain parts of the pump.

The pump disclosed in Fig. 1 of the drawings comprises a cylindrical body member 2 having an open end 4 and a closed end 6, in the latter of which are formed inlet and outlet passages 8, 10 which include enlarged valve chambers 12, 14. A ball valve member 16 is disposed in inlet valve chamber 12 and is urged by spring 18 away from a conical valve seat at the inner end of the valve chamber. A ball valve member 20 is disposed in outlet valve chamber 14 and is urged by spring 22 into seated engagement with a conical valve seat at the inner end of the chamber. Disposed within the cylindrical body member 2 is a hollow, cylindrical member 30 formed of rubber or other flexible, resilient material and having a closed end 32 which, with the cylindrical body member 2 and the closed end 6 of body member 2 defines the pump chamber 34 which communicates with external devices for the supply and delivery of liquid or gas through the passages 8, 10 and valve chambers 12, 14. At its other end the resilient member 30 is open, as shown at 35, to permit a rod 36 having a head 38 to extend into the cylindrical resilient member and engage the closed end 32 of the resilient member 30. The rod 36 may be reciprocated by any suitable means, as indicated by the arrow in the drawing. The wall of open end 35 of the resilient member 30 is thicker than the remainder of this member, as shown at 40, and this thicker portion is provided with an annular recess 42 opening toward the closed end of the body member 2 and within which the annular wall of open end 4 of the body part 2 of the pump is received. An annular clamping ring 43 surrounds the enlarged end 40 of the resilient member and tightly binds the inner wall of the recess 42 to the outer wall of the body member 2. A helical spring 44 is disposed inside the hollow resilient member 30 and its convolutions engage the inner wall thereof, thus preventing collapse of the wall of the cylindrical resilient member while, at the same time, allowing such member to be extended lengthwise into the body member 2 to decrease the displacement of the pump chamber 34. The convolutions of the spring 44 are continued across the inner surface of the closed end 32 of the cylindrical resilient member, as shown at 46, to provide a seat for the end of rod 36. If desired, the spring may be embedded in the resilient member 30, as shown at 50 in Fig. 2. Alternatively, annular round or flat wire rings 52 may be used in place of the spring convolutions, as shown in Fig. 3.

In the operation of the pump provided by my invention and described in this application, the rod 36 is reciprocated by any suitable means. As the rod moves inwardly, the resilient member 30 is elongated and the outer surface of the end wall 32 thereof is moved toward the inner surface of the end wall 6 of the body member 2, thereby reducing the volume of the pump chamber 34. Compression of the liquid (or gas) within this chamber will cause ball valve 16 to seat against the annular surface at the upper or outer end of valve chamber 8, thereby preventing any inlet of liquid to valve chamber 12. At the same time, the pressure of liquid in pump chamber 34 will move outlet ball valve 20 upwardly against the force of spring 22, thereby permitting liquid to pass from pump chamber 34 through outlet valve chamber 14 into outlet passage 10. On the reverse, or downward stroke of the pump rod 36 the resilient member 30 will follow the movement of the pump rod thereby enlarging the pump chamber 34. Suction due to this enlargement will move inlet ball valve 16 off of its seat at the top of inlet valve chamber 12 and will move outlet ball valve 20 onto its seat at the bottom of outlet valve chamber 14. Liquid will thereby be drawn into the pump chamber 34 past valve ball 16, while the valve ball 20 will prevent any connection between the pump chamber 34 and outlet passage 10. The spring 44 or the spring 50 or rings 52, will at all times support the cylindrical wall of the resilient member 30 from forward collapse while permitting free expansion and contraction thereof with the reciprocatory movement of the rod 36. Leakage of fluid will be prevented by the tight engagement between the outer and inner surfaces of the outer end 4 of the cylindrical body member 2 and the walls of the annular recess 42 within which the outer end of the cylindrical body member is received.

While I have described and illustrated one embodiment of my invention it will be apparent to those skilled in the are that other embodiments as well as modifications of that disclosed, may be made and practiced without departing in any way from the spirit or scope of the invention, for the limits of which reference must be made to the appended claims.

What is claimed is:

1. A reciprocating pump comprising a cylindrical body member having an open end and a closed end having two passages therethrough, inlet and outlet valve means in said passages respectively, a hollow cylindrical extensible resilient member disposed within said cylindrical body member and having a closed end adjacent the closed end of said body member defining therewith a pump chamber and having an open end attached to the open end of said body member, the outer wall of said resilient member being expansible outwardly throughout its length to engage at all times the inner wall of the cylindrical body member regardless of the degree of extension of said resilient member, a rod extending into said cylindrical resilient member and bearing at its one end on the inner surface of the closed end thereof and adapted to be reciprocated to move the closed end of said cylindrical resilient member toward and away from the closed end of said cylindrical body member.

2. A reciprocating pump comprising a cylindrical body member having an open end and a closed end having two passages therethrough, inlet and outlet valve means in said passages respectively, a hollow cylindrical extensible resilient member disposed within said cylindrical body member having a closed end adjacent the closed end of said body member defining therewith a pump chamber and having an open end at and adjacent the open end of said cylindrical body member, the wall of said open end being thicker than the remainder of said resilient member and having an annular recess formed in the thickened wall thereof within which the open end wall of said cylindrical body member is received, the outer wall of said resilient member being expansible outwardly throughout its length to engage at all times the inner wall of the cylindrical body member regardless of the degree of extension of said resilient member, a rod extending into said cylindrical resilient member and bearing at its one end on the inner surface of the closed end thereof and adapted to be reciprocated to move the closed end of said cylindrical resilient member toward and away from the closed end of said cylindrical body member.

3. A reciprocating pump comprising a cylindrical body member having an open end and a closed end having two passages therethrough, inlet and outlet valve means in said passages respectively, a hollow cylindrical extensible resilient member disposed within said cylindrical body member having a closed end adjacent the closed end of said body member defining therewith a pump chamber and having an open end attached to the open end of said body member, the outer wall of said resilient member being expansible outwardly throughout its length to engage at all times the inner wall of the cylindrical body member regardless of the degree of extension of said resilient member, a rod extending into said cylindrical resilient member bearing at its one end on the inner surface of the closed end thereof and adapted to be reciprocated to move the closed end of said cylindrical resilient member toward and away from the closed end of said cylindrical body member, and a helical spring disposed within said hollow resilient cylindrical member with its convolutions engaging the inner wall thereof said spring maintaining the engagement between the inner wall of the cylindrical body member and the outer wall of the resilient member.

4. A reciprocating pump comprising a cylindrical body member having an open end and a closed end having two passages therethrough, inlet and outlet valve means in said passages respectively, a hollow cylindrical extensible resilient member disposed within said cylindrical body member having a closed end adjacent the closed end of said body member defining therewith a pump chamber and having an open end attached to the open end of said body member, the outer wall of said resilient member being expansible outwardly throughout its length to engage at all times the inner wall of the cylindrical body member regardless of the degree of extension of said resilient member, a rod extending into said cylindrical resilient member bearing at its one end on the inner surface of the closed end thereof and adapted to be reciprocated to move the closed end of said cylindrical resilient member toward and away from the closed end of said cylindrical body member, and a plurality of annular members, disposed within said hollow resilient cylindrical member and spaced along the length thereof and engaging the inner wall thereof.

5. A reciprocating pump according to claim 3, in which the convolutions of the helical spring are continued across the inner surface of the closed end of the resilient member to provide a seat for the end of the rod.

References Cited in the file of this patent
UNITED STATES PATENTS

| | | |
|---|---|---|
| 2,027,979 | Hopkins | Jan. 14, 1936 |
| 2,191,861 | Rymal | Feb. 27, 1940 |
| 2,299,315 | Evans | Oct. 20, 1942 |
| 2,342,906 | Smith | Feb. 29, 1944 |